(12) United States Patent
Golsch

(10) Patent No.: US 11,330,431 B2
(45) Date of Patent: May 10, 2022

(54) TARGETED ADVERTISING WITH PRIVACY AND ANTI-REPLAY PROTECTION

(71) Applicants: DENSO International America, Inc., Southfield, MI (US); DENSO CORPORATION, Kariya (JP)

(72) Inventor: Kyle Golsch, Pontiac, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 405 days.

(21) Appl. No.: 16/359,198

(22) Filed: Mar. 20, 2019

(65) Prior Publication Data

US 2019/0306711 A1 Oct. 3, 2019

Related U.S. Application Data

(60) Provisional application No. 62/649,010, filed on Mar. 28, 2018.

(51) Int. Cl.
*H04W 8/00* (2009.01)
*H04W 12/06* (2021.01)
(Continued)

(52) U.S. Cl.
CPC ......... *H04W 12/06* (2013.01); *H04L 63/0853* (2013.01); *H04L 63/0869* (2013.01);
(Continued)

(58) Field of Classification Search
CPC .................................. H04W 12/06; H04W 4/80
See application file for complete search history.

(56) References Cited

U.S. PATENT DOCUMENTS 6,804,525 B2 10/2004 Davis et al.
7,027,772 B2 4/2006 Chen et al.
(Continued)

FOREIGN PATENT DOCUMENTS

BR 102014017465 A2 2/2016
CN 104574593 A 4/2015
(Continued)

OTHER PUBLICATIONS

"Bluetooth Low Energy," Eiji Adachi, Chapters Protocol for RF Communication Control Unit, Interface, Japan, CQ Publishing Co., Aug. 1, 2015, vol. 41, Issue 8 (Serial No. 458), p. 102-106.

*Primary Examiner* — Tuan H Nguyen
(74) *Attorney, Agent, or Firm* — Harness, Dickey & Pierce, P.L.C.

(57) ABSTRACT

A system and method for a vehicle including a scanner; and an advertising device configured to: (i) exchange security information with the scanner; (ii) pair with the scanner in response to the security information of the scanner being authenticated; (iii) generate and store a target ID for the scanner in a memory of the advertising device; (iv) assign and transmit the target ID to the scanner; and (v) broadcast an advertising packet (i) exchange security information with the advertising device; (ii) pair with the advertising device in response to the security information of the advertising device being authenticated; (iii) receive and save the target ID assigned by the advertising device; (iv) receive the advertising packet containing the target ID; and (v) determine, in response to receiving the advertising packet, whether the target ID contained in the advertising packet matches the target ID of the scanner.

19 Claims, 9 Drawing Sheets

(51) Int. Cl.
*H04W 4/80* (2018.01)
*H04L 29/06* (2006.01)
*H04W 4/40* (2018.01)
*H04W 4/02* (2018.01)
*H04W 76/10* (2018.01)
*H04W 12/50* (2021.01)
*H04W 12/108* (2021.01)
*H04W 12/122* (2021.01)

(52) U.S. Cl.
CPC ........ *H04L 63/126* (2013.01); *H04L 63/1466* (2013.01); *H04W 4/025* (2013.01); *H04W 4/40* (2018.02); *H04W 4/80* (2018.02); *H04W 8/005* (2013.01); *H04W 12/108* (2021.01); *H04W 12/122* (2021.01); *H04W 12/50* (2021.01); *H04W 76/10* (2018.02)

(56) References Cited

U.S. PATENT DOCUMENTS

| | | |
|---|---|---|
| 7,885,643 B2 | 2/2011 | Shimomura |
| 8,515,654 B2 | 8/2013 | Turner et al. |
| 8,626,144 B2 | 1/2014 | Talty et al. |
| 8,930,045 B2 | 1/2015 | Oman et al. |
| 9,008,917 B2 | 4/2015 | Gautama et al. |
| 9,123,244 B2 | 9/2015 | Daman et al. |
| 9,185,652 B2 | 11/2015 | Xie et al. |
| 9,218,700 B2 | 12/2015 | Gautama et al. |
| 9,688,247 B1 | 6/2017 | Jayaraman et al. |
| 9,794,753 B1 | 10/2017 | Stitt et al. |
| 9,894,492 B1 | 2/2018 | Elangovan et al. |
| 10,002,479 B2 | 6/2018 | Oz et al. |
| 2010/0202346 A1 | 8/2010 | Sitzes et al. |
| 2011/0215921 A1 | 9/2011 | Ben Ayed et al. |
| 2012/0045058 A1 | 2/2012 | Weghaus |
| 2013/0214732 A1 | 8/2013 | Nowottnick |
| 2013/0259230 A1 | 10/2013 | Polo et al. |
| 2014/0152091 A1 | 6/2014 | Muller et al. |
| 2014/0188348 A1 | 7/2014 | Gautama et al. |
| 2014/0240091 A1 | 8/2014 | Talty et al. |
| 2014/0274013 A1 | 9/2014 | Santavicca |
| 2014/0330449 A1 | 11/2014 | Oman et al. |
| 2014/0364119 A1 | 12/2014 | Bradley et al. |
| 2015/0072618 A1 | 3/2015 | Granbery |
| 2015/0148989 A1 | 5/2015 | Cooper et al. |
| 2015/0161832 A1 | 6/2015 | Esselink et al. |
| 2015/0161834 A1 | 6/2015 | Spahl et al. |
| 2015/0172391 A1* | 6/2015 | Kasslin ............ H04W 52/0229 370/338 |
| 2015/0310681 A1 | 10/2015 | Avery et al. |
| 2015/0356289 A1 | 12/2015 | Brown et al. |
| 2015/0356797 A1 | 12/2015 | McBride et al. |
| 2016/0041820 A1 | 2/2016 | Ricci et al. |
| 2016/0050563 A1 | 2/2016 | Bronk |
| 2016/0063786 A1 | 3/2016 | Lewis et al. |
| 2016/0087485 A1 | 3/2016 | Maeda et al. |
| 2016/0150407 A1 | 5/2016 | Michaud et al. |
| 2016/0278006 A1* | 9/2016 | Lee ........................ H04W 4/80 |
| 2017/0018128 A1 | 1/2017 | Berezin et al. |
| 2017/0062938 A1 | 3/2017 | Cheng et al. |
| 2017/0104589 A1 | 4/2017 | Lambert et al. |
| 2017/0132533 A1 | 5/2017 | Darnell et al. |
| 2017/0178477 A1 | 6/2017 | Turgeon |
| 2017/0201441 A1 | 7/2017 | Choi et al. |
| 2017/0236351 A1 | 8/2017 | Menard et al. |
| 2017/0303080 A1 | 10/2017 | Stitt et al. |
| 2017/0303090 A1 | 10/2017 | Stitt et al. |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0269565 A1 | 9/2018 | Guthrie et al. |

FOREIGN PATENT DOCUMENTS

| | | |
|---|---|---|
| EP | 2800068 A2 | 11/2014 |
| FR | 3026212 A1 | 3/2016 |
| JP | 2015190774 A | 11/2015 |
| WO | WO-2015024185 A1 | 2/2015 |
| WO | WO-2015032956 A2 | 3/2015 |
| WO | WO-2015103605 A1 | 7/2015 |
| WO | WO-2015160859 A1 | 10/2015 |
| WO | WO-2015177298 A1 | 11/2015 |
| WO | WO-2015187608 A1 | 12/2015 |
| WO | WO-2016012723 A1 | 1/2016 |
| WO | WO-16156682 A1 | 10/2016 |
| WO | WO-2017/181035 A1 | 10/2017 |
| WO | WO-2017/181050 A1 | 10/2017 |
| WO | WO-18040641 A1 | 3/2018 |

* cited by examiner

TARGETED ADVERTISING WITH PRIVACY AND ANTI-REPLAY PROTECTION

CROSS-REFERENCE TO RELATED APPLICATION

This application claims the benefit of U.S. Provisional Application No. 62/649,010, filed on Mar. 28, 2018. The entire disclosure of the above application is incorporated herein by reference.

FIELD

The present disclosure relates to systems and methods for targeted advertising and, more particularly, to systems and methods for accessing a vehicle using targeted advertising with enhanced data privacy and anti-replay protection.

BACKGROUND

This section provides background information related to the present disclosure which is not necessarily prior art.

Wireless devices such as computers, smart phones, tablets, and the like use a wireless personal area network (WPAN), such as Bluetooth® Low Energy (BLE), for data transmission to other wireless devices. The operating systems of many computer systems and wireless devices natively support BLE.

"Advertising" occurs when a BLE-enabled device ("advertiser" or "advertising device") broadcasts an advertising data signal to announce the presence and services of the advertiser to other devices ("scanner" or "scanning device") scanning for the advertising data signal. Likewise, the advertising data may advertise to announce a connection request to one or more scanning devices. Advertising from a BLE device can be either directed or undirected, where directed advertising means connection from the advertising device to a scanning device is targeted. The application programming interfaces (APIs) of BLE-enabled advertising devices restrict the advertising devices to undirected advertising. The BLE protocol itself permits an advertiser to only target one scanning device at a time and does not provide for simultaneous target of multiple scanning devices. While advertising on existing BLE-enabled devices is suitable for its intended use, advertising is subject to improvement.

The present teachings include improved systems, methods, and devices for targeted advertising with privacy and anti-replay protection, which provide numerous advantages over existing systems, methods, and devices, as explained herein, and as one skilled in the art will appreciate.

SUMMARY

This section provides a general summary of the disclosure, and is not a comprehensive disclosure of its full scope or all of its features.

A system is provided that includes a scanner. The system also includes an advertising device configured to: (i) exchange security information with the scanner; (ii) pair with the scanner in response to the security information of the scanner being authenticated; (iii) generate a target id for the scanner and store the target id of the scanner in a memory of the advertising device; (iv) assign and transmit the target id to the scanner; and (v) broadcast an advertising packet that includes the target id of the scanner. The system also includes where the scanner is configured to (i) exchange security information with the advertising device; (ii) pair with the advertising device in response to the security information of the advertising device being authenticated; (iii) receive and save the target id assigned by the advertising device; (iv) receive the advertising packet containing the target id; and (v) determine, in response to receiving the advertising packet, whether the target id contained in the advertising packet matches the target id of the scanner.

A method is also provided and includes: (i) exchanging, with an advertising device and a scanner, security information; (ii) pairing the advertising device and the scanner in response to the security information of the advertising device and the scanner being authenticated; (iii) generating, with the advertising device, a target id for the scanner and storing the target id of the scanner in a memory of the advertising device; (iv) assigning and transmitting, with the advertising device, the target id to the scanner; (v) receiving and saving, with the scanner, the target id assigned by the advertising device; (vi) broadcasting, with the advertising device, an advertising packet that includes the target id of the scanner; (vii) receiving, with the scanner, the advertising packet containing the target id; and (viii) determining, with the scanner, whether the target id contained in the advertising packet matches the target id of the scanner in response to receiving the advertising packet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To address the above issues with traditional advertising devices, the present teachings include systems and methods for targeted advertising with privacy and anti-replay protection from one or more advertising devices to one or more scanning devices. As described in further detail below, a system including an advertising device and a scanner that have established a prior trust relationship may be used to wirelessly exchange data between the advertising device and the scanner. For example, an advertising device such as a smartphone and a scanner in connection with a vehicle electrical control unit (ECU) may be used to allow the user of the mobile phone to access a vehicle, such as unlocking the vehicle doors, or control a vehicle, such as controlling the ignition of a vehicle. In another example, the system may provide multiple advertising devices that have established a trust relationship with a single scanner the capability of wirelessly exchanging data between the advertising devices and the scanner. In yet another example, the system may provide a single advertising device that has established a prior trust relationship with multiple scanners the capability of wirelessly exchanging data between the advertising device and the scanners.

Figure 1:
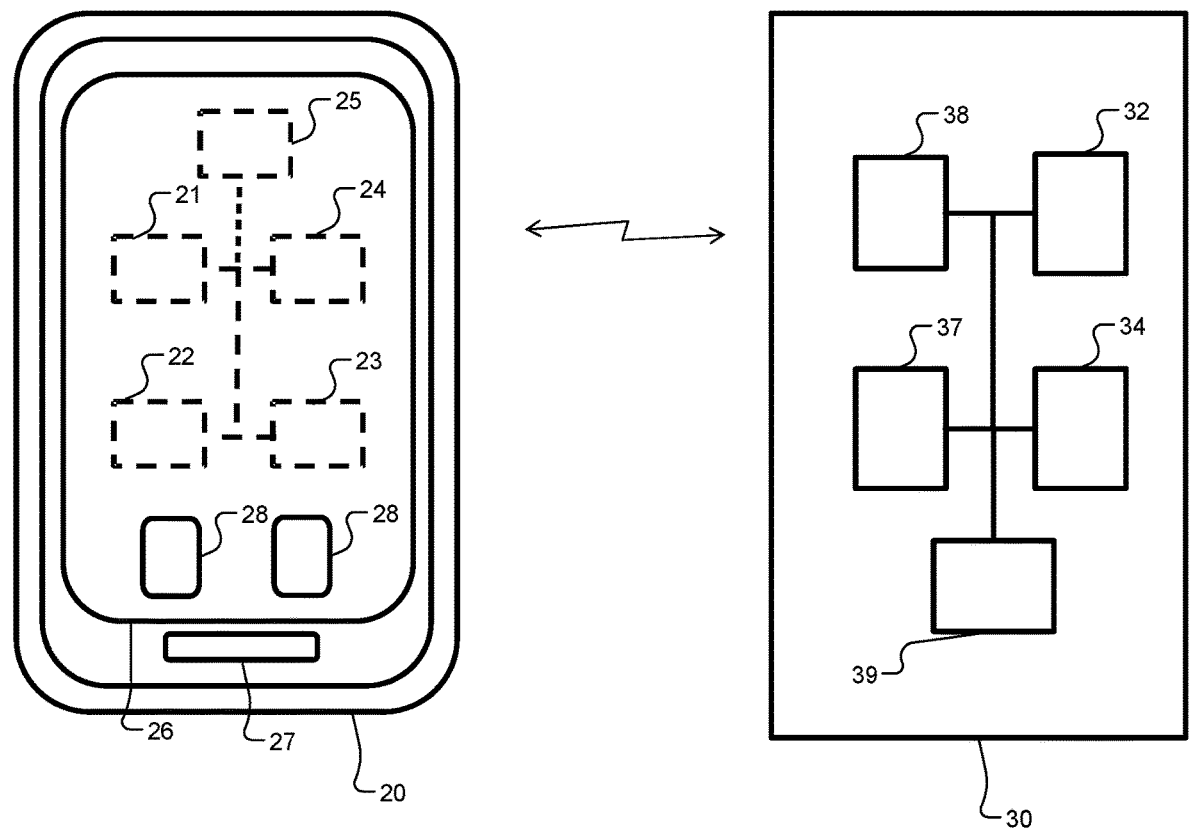
FIG. 1 illustrates a targeted advertising system including a scanner and an advertising device according to the present disclosure.

With reference to FIG. 1, a system 10 for targeted advertising is illustrated. The system 10 includes an advertising device 20 and a scanner 30. The advertising device 20 and the scanner 30 can communicate with each other using a wireless communication protocol suitable for communication over short distances, such as, for example, using Bluetooth® Low Energy (BLE) (also referred to as Bluetooth® Smart), a near field communication protocol, Wi-Fi, Wi-Fi direct, ultra-side band (UWB) communication, such as impulse-radio (IR) UWB, or any other suitable wireless communication protocol. For example, the advertising device 20 includes Bluetooth®-enabled devices running a mobile operating system (OS) that supports BLE, such as smartphones, tablets, and like devices, or any other suitable wireless communication protocol. BLE allows the advertising device 20 and the scanner 30 to communicate within a range of 150-300 feet. Connection between the advertising device 20 and the scanner 30 is direct and quicker using the BLE protocol than a cellular connection, and the advertising device 20 using BLE can be used without cellular coverage or a cellular subscription to communicate with the scanner 30.

As shown in FIG. 1, the advertising device 20 includes a processor 21, a memory 22, a wireless communication chip 23, an antenna 24, a global positioning system (GPS) 25, a display 26, and an input 27. The processor 21 can execute a mobile operating system stored in the memory 22 to operate the advertising device 20. Such mobile operating systems may include, but are not limited to, iOS, Widows-based mobile OS, Android-based OS, BlackBerry-based OS, Linux-based OS, and the like. The wireless communication chip 23 and the antenna 24 provides the advertising device 20 with wireless communication capabilities using a wireless communication protocol such as Bluetooth, 802.11, BLE, Wi-Fi, Wi-Fi direct, UWB, IR UWB, and/or any other suitable wireless protocol. While shown as only one chip in FIG. 1, the advertising device 20 may include one or more wireless communication chips 23 to support different wireless communication protocols. The antenna 24 is used to send and receive data encoded on a radio wave. Data received by the antenna 24 may be stored in the memory 22 and processed by the processor 21. The GPS 25 can provide both geolocation and time data of the advertising device 20 and send the geolocation and time data to the scanner 30. The mobile OS can interface with hardware components such as the display 26 and the input 27 to provide a graphical user interface (GUI) to a user in order to control the advertising device 20. The display 26 can output graphical data to a user of the advertising device 20. The display 26 may also include input capabilities such as a touchscreen to allow a user to provide data and control signals to the advertising device 20, for example, by touching icons 28. The touch icons 28 may be dedicated buttons or similar user input features.

As shown in FIG. 1, the scanner 30 includes a processor 32, a memory 34, a communication module 36, a GPS module 37, a wireless communication chip 39 connected to an antenna 38. The antenna 38 is used to send and receive data encoded on a radio wave. Data received by the antenna 38 may be stored in the memory 34 and processed by the processor 32. The GPS module 37 can provide both geolocation and time data of the vehicle and send the geolocation and time data to the advertising device 20. The scanner 30 is connected to an electronic control unit (ECU) within a vehicle. The ECU may control one or more systems and subsystems in the vehicle such as the communication module 36, the GPS module 37, a locking system of a vehicle or an ignition of the vehicle or any other system of the vehicle.

Figure 2A:
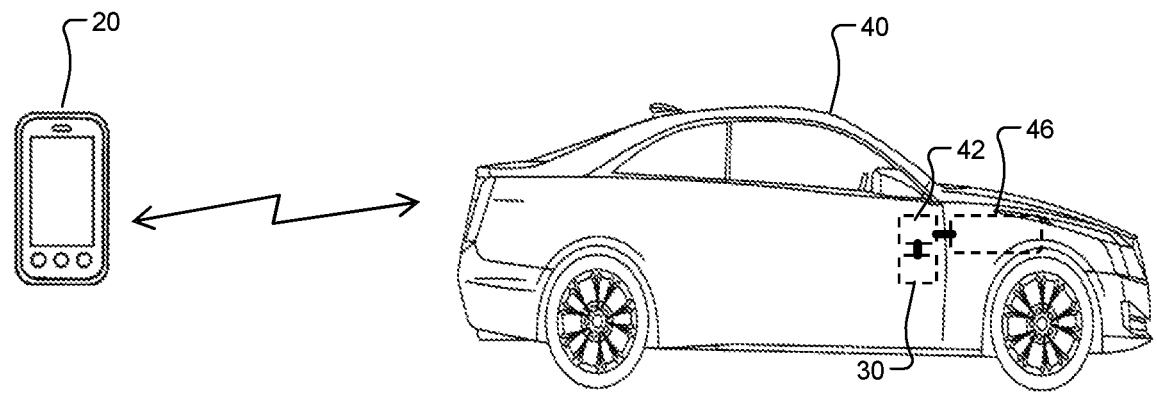
FIGS. 2A-2C illustrate targeted advertising systems according to the present disclosure.

With reference to FIG. 2A, the targeted advertising system 10 including the advertising device 20 is shown communicating with the scanner 30 within a vehicle 40 through the ECU 42. After a trust relationship is established between the advertising device 20 and the scanner 30, described in further detail below, the advertising device 20 may wirelessly communicate with the scanner 30 to provide control signals to the ECU 42. For example, a user can use BLE capabilities of the advertising device 20 to send a control signal to the scanner 30 and further to the ECU 42 to unlock a door of the vehicle 40. In another example, a user of the advertising device 20 can send a control signal to the scanner 30 and further to the ECU 42 to start the vehicle 40 via an ignition system 46. For further example, the scanner 30 may determine a location of the advertising device 20 based on signal information about signals received from the advertising device 20. For example, the scanner 30 may determine a location of the advertising device 20 based on a received signal strength indication (RSSI) of wireless communication signals received from the advertising device. Additionally or alternative, the scanner 30 may determine the location of the advertising device based on other signal information about the wireless signals received from the advertising device 20, such as, for example, angle of arrival information about wireless signals received from the advertising device 20 and round trip time of flight information about signals sent to the advertising device 20 from the scanner 30 and received from the advertising device by the scanner 30.

Figure 2B:
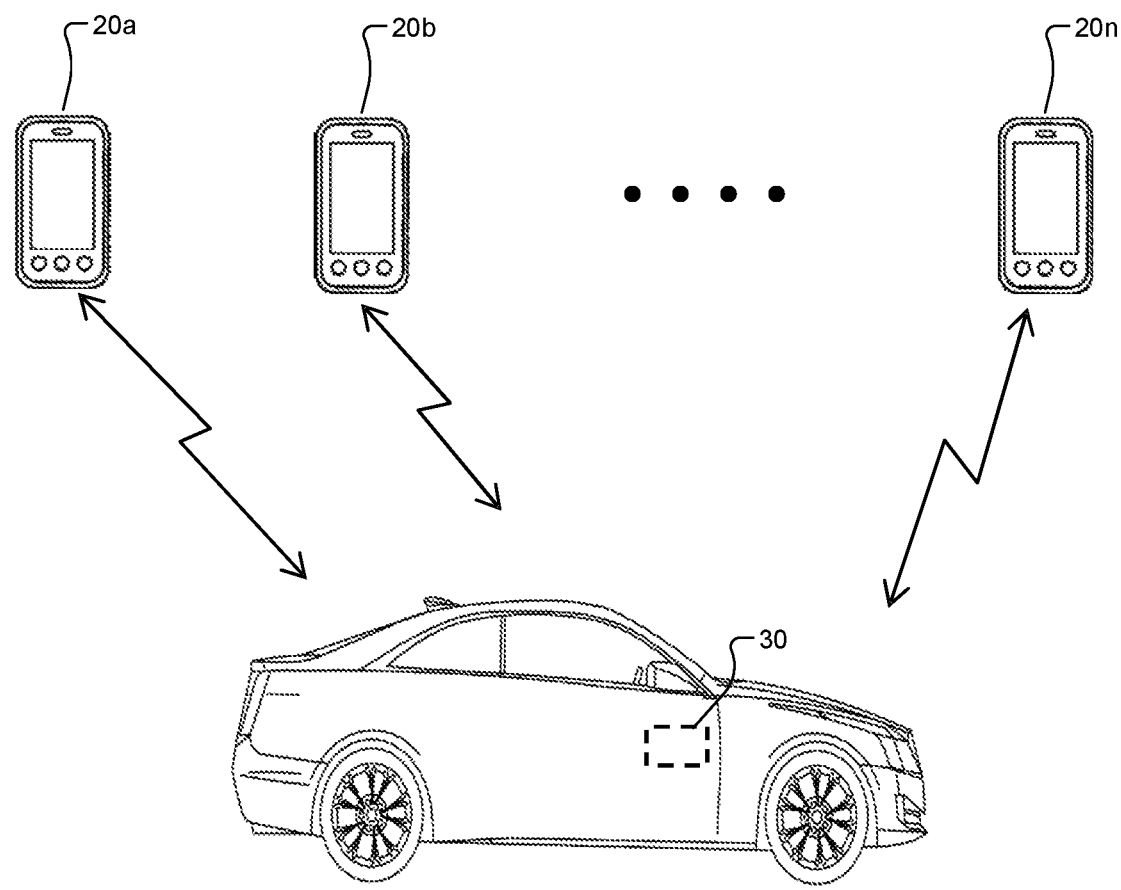

With reference to FIG. 2B, the system for targeted advertising 10 provides for multiple advertising devices 20a, 20b, and 20n to communicate with the scanner 30 within the vehicle 40 after each of the advertising devices 20a 20b, and 20n establishes a trust relationship with the scanner 30. The advertising devices 20a, 20b, and 20n each communicate at a distinct time with the scanner 30. For example, as shown in FIG. 2B, the system for targeted advertising is used for peer-to-peer car-sharing/rental. The advertising devices 20a, 20b, and 20n may include a peer-to-peer rental application that allow the users of the advertising devices 20a, 20b, and 20n to unlock and start the vehicle 40 when the geolocation and time data on each of the advertising devices 20a, 20b, and 20n corresponds to the geolocation and time data of the scanner 30.

Figure 2C:
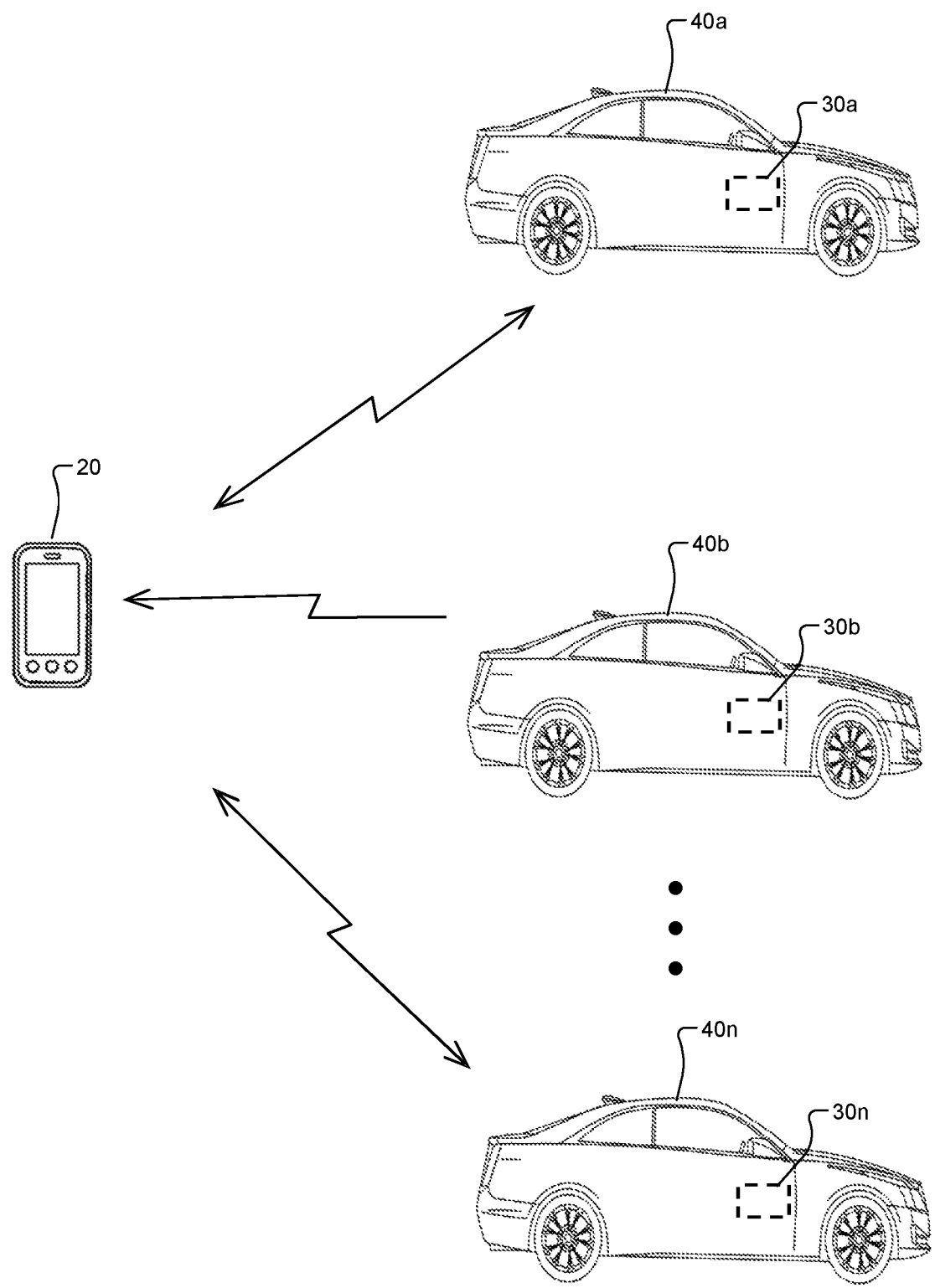

With reference to FIG. 2C, the system for targeted advertising 10 provides for the advertising device 20 to communicate with multiple scanners 30a, 30b, and 30n within vehicles 40a, 40b and 40n after the advertising device 20 establishes a trust relationship with each of the scanners 30a, 30b, and 30n. For example, the advertising device 20 can control a fleet vehicles—that is, a group of vehicles 40a, 40b, and 40n. The advertising device 20 may run an application whereby the scanners 30a, 30b, and 30n within certain vehicles of the fleet may be selected for targeted advertising such that the advertising device 20 can send control signals to only the targeted scanners. In this example, the advertising device 20 can connect to vehicles 40a, 40b, and 40n simultaneously.

As described in greater detail below, once the advertising device 20 is configured via an application running on the advertising device 20, and a trust relationship is established between the advertising device 20 and the scanner 30, the system for targeted advertising 10 allows for automatic, simultaneous communication connection between one or more wireless devices 20 and one or more scanners 30. As such, a user of the advertising device 20 does not have to know a broadcast ID of for an individual scanner 30, and does not have to manually provide further input to the advertising device 20 to establish a communication connection between the advertising device 20 and the scanner 30.

Before the advertising device 20 and the scanner 30 can communicate and transmit data between one another, the advertising device 20 and the scanner 30 must be paired or bonded with one another. Once paired, the advertising device 20 and the scanner 30 will have a trusted relationship with each other. The advertising device 20 and the scanner 30 will have a media access control (MAC) address, a unique identifier assigned to network communication devices for communicating data. When using the BLE protocol, the real MAC addresses of the advertising device 20 and the scanner 30 are not revealed, but rather a randomly generated MAC address is generated for both the advertising device 20 and the scanner 30. Once the advertising device 20 and the scanner 30 are paired and trusted relationship is established between the advertising device 20 and the scanner 30, an encryption key, such as the Identity Resolution Key (IRK) is exchanged between the advertising device 20 and the scanner 30 so as to determine the real MAC addresses of both the advertising device 20 and the scanner 30 from the randomly generated MAC addresses.

Figure 3:
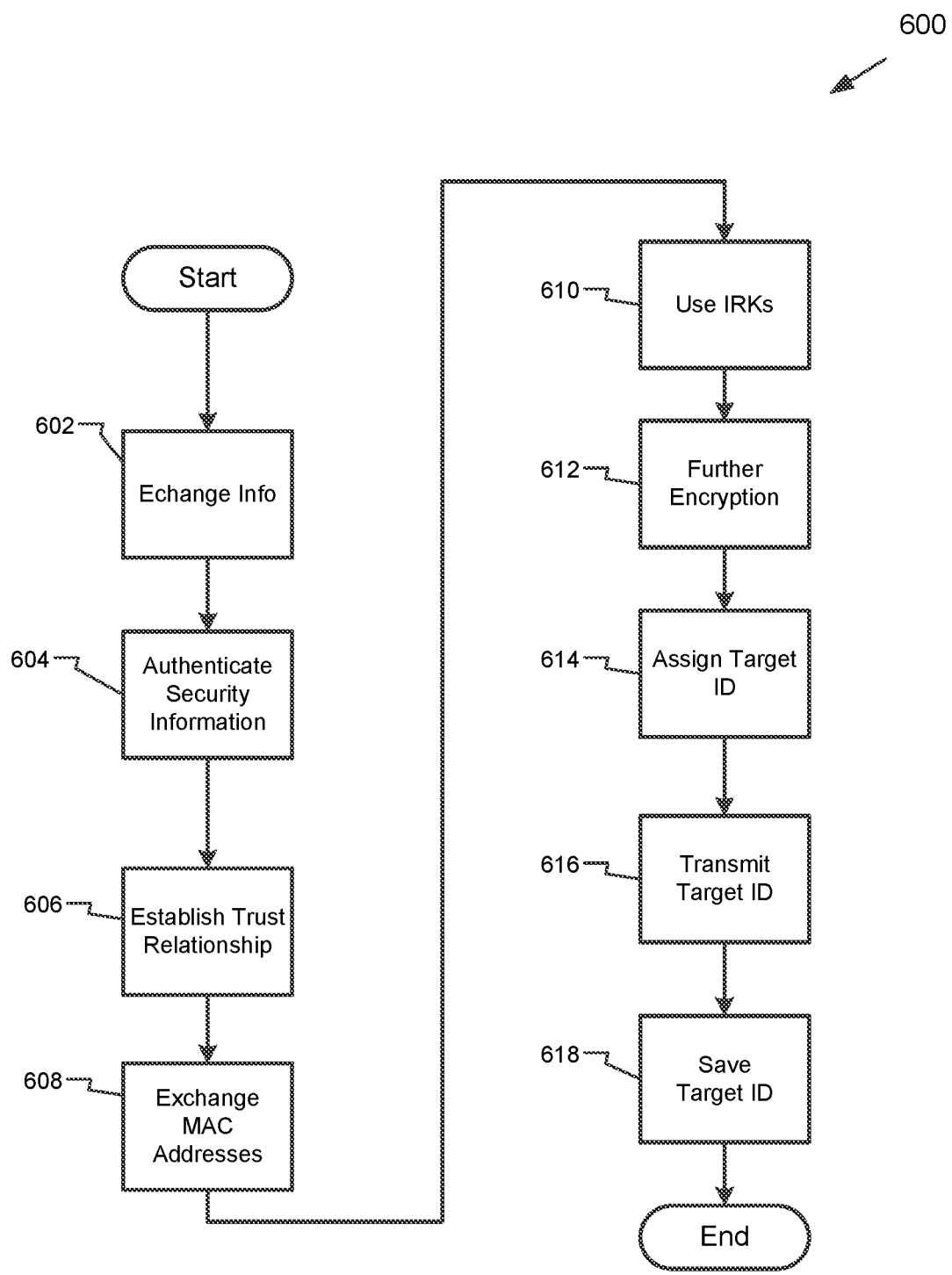
FIG. 3 illustrates a method of pairing an advertising device to a scanner according to the present disclosure.

With reference to FIG. 3, a flow diagram for a method of pairing the advertising device 20 to the scanner 30 is shown. The method 600, for example, can be performed by the advertising device 20 and the scanner 30. The method starts at 602 with the advertising device 20 and the scanner 30 exchanging security information with each other. Once the security information between the advertising device 20 and the scanner 30 is authenticated at 604, a trusted relationship between the advertising device 20 and the scanner 30 is formed at 606.

At 608, both the advertising device 20 and the scanner 30 exchange MAC address information. IRKs are used at 610 to determine the real MAC addresses of the advertising device 20 and the scanner 30. At 612, a completed pairing link between the advertising device 20 and the scanner 30 can be further encrypted to encrypt data sent between the advertising device 20 and the scanner 30 for additional security, as described in greater detail below.

At 614, the advertising device 20 assigns a target ID to the scanner 30, and saves the target ID to the memory of the advertising device 20. The target ID assigned to the scanner 30 is unique to the scanner 30. At 616, the advertising device 20 transmits the target ID to the scanner 30.

At 618, the scanner 30 receives and saves the target ID to a table in memory along with other data obtained from the advertising device 20 during the pairing process such as the MAC address and IRK and control may end.

After the secure pairing process is completed and a trusted relationship between the advertising device 20 and the scanner 30 is established, the advertising device 20 can use the target ID it assigned to the scanner 30 during the pairing process to directly target the scanner 30.

Wireless devices, such as advertising device 20, broadcast advertising packets to the scanners, such as the scanner 30, looking for the advertising devices 20. The advertising packet contains information about the advertising device 20, such as a list of services hosted by the advertising device 20. For example, the advertising device 20 can advertise vehicle access capabilities as its service. Based on the advertising packet broadcast by the advertising device 20 and received by the scanner 30, the scanner 30 can recognize that the advertising device 20 is capable of vehicle access.

Figure 4:
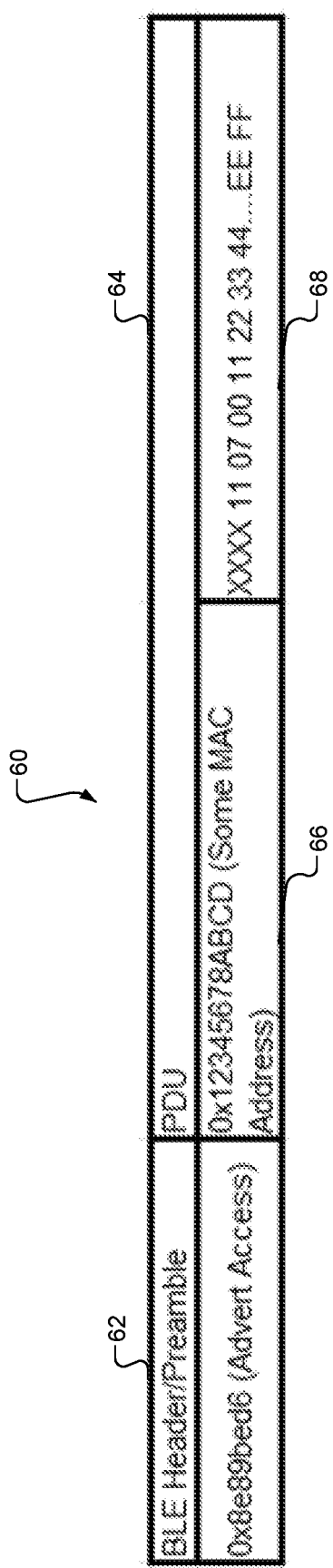
FIG. 4 illustrates an advertising packet according to the present disclosure.

With reference to FIG. 4, an advertising packet 60 is shown. The advertising packet 60 is sent from the advertising device 20 to the scanner 30 to convey the services offered by the advertising device 20. The advertising packet 60 contains a BLE Header/Preamble 62 and a protocol data unit (PDU) 64. The PDU 64 is further divided into a MAC address of the advertising device 20 and advertising data 68. The advertising data 68 may contain between zero and thirty-one bytes of data.

Figure 5:
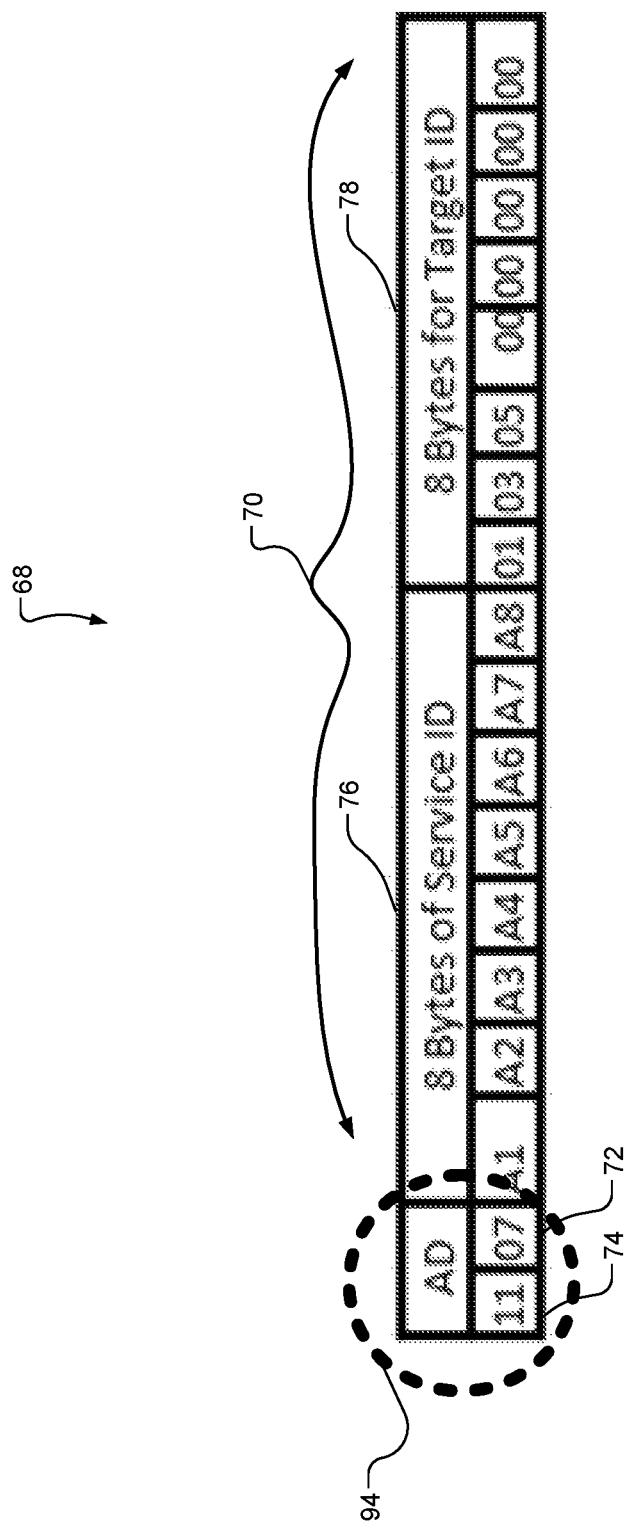
FIG. 5 illustrates advertising data according to the present disclosure.

With reference to FIG. 5, the advertising data 68 may be further subdivided into a universally unique identifier (UUID) 70, an AD Header 94 including a one byte advertising data type (AD Flag) 72 and an indicator 74. The UUID 70 is a one hundred twenty-eight bit number used to convey service information from the advertising device 20 to the scanner 30. The indicator 74 identifies the byte-size of the advertising data 68. The AD Flag 72 is a parsing flag that indicates how the scanner 30 should parse the advertising packet 60 sent from the advertising device 20.

As shown in FIG. 5, the indicator 74 shows "11" which indicates that advertising data 68 has a byte-size of seventeen bytes. The AD Flag 72 shows "07" which is an assigned number of the generic access profile of the Bluetooth® specification. As shown here, AD Flag "07"—that is, 0x07 corresponds to a complete list of one hundred twenty-eight-bit Service Class UUIDs, though the AD Flag 72 is not limited to "07." AD Flags "06"—that is, 0x06 corresponding to an incomplete list of one hundred twenty-eight-bit Service Class UUIDs and "FF"—that is, 0xFF corresponding to manufacturer specific data may also be used. Based on restrictions of the APIs of current wireless devices, AD Flags "06" and "07" are suitable for use. Using AD Flag "FF" allows for a larger advertising data 68 byte size. For example, AD Flag "FF" would allow for a total of 28 bytes, which is 10 more bytes than the AD Flags "06" and 07" allow for. Thus, using AD Flag "FF" would allow for more service IDs and target IDs to be stored.

The UUID 70 is manipulated by the API on the advertising device 20 to contain the unique target ID assigned to the scanner 30, so that the advertising device 20 can directly target the scanner 30. The UUID 70 is further subdivided into a service ID 76 portion and target ID 78 portion. The service ID 76 communicates to the scanners the intent of the advertising device 20, while the target ID 78 indicates a pattern or array of unique target IDs of scanners targeted by the advertising device 20. While both service ID 76 and target ID 78 are shown as eight bytes in size, both service ID 76 and target ID 78 are not limited to these byte sizes. For example, service ID 76 can be a smaller byte size so that the target ID 78 has a larger byte size. As shown, each byte of the eight byte target ID 78 can target a uniquely identified scanner, such that up to 255 scanners can be targeted by the advertising device 20, allowing the advertising device 20 to simultaneously connect to eight scanners. The target ID 78 is not limited to this convention. For example, instead of using each of the eight bytes of the target ID 78 as shown in FIG. 5, every two bytes may represent a unique target ID such that 65,535 scanners can be targeted by the advertising device 20, yet only allowing the advertising device 20 to connect simultaneously to four scanners. When the array of target IDs 78 are empty, the advertising device 20 does not directly target any scanners.

Figure 6:
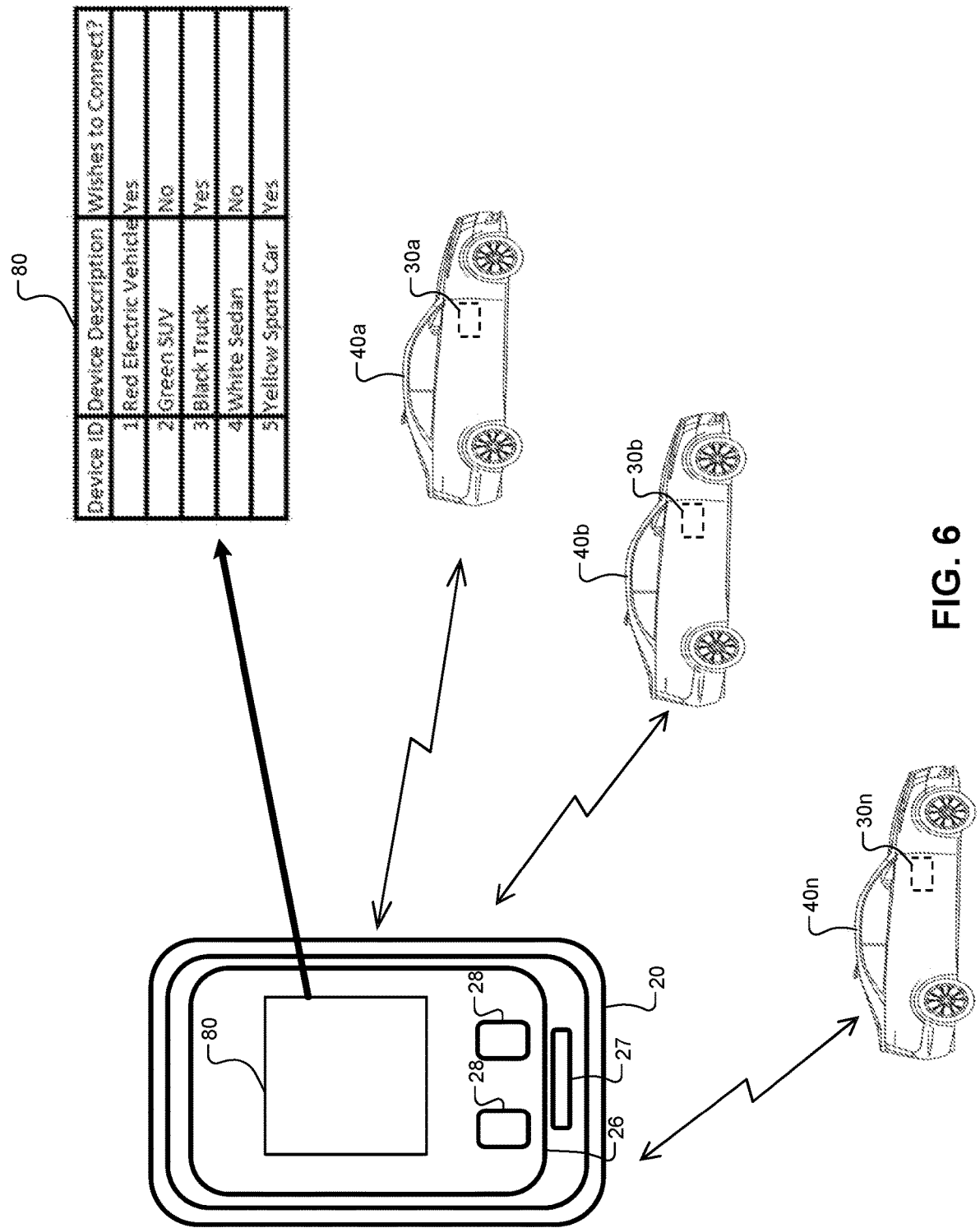
FIG. 6 is an example of an advertising device displaying a table of target IDs according to the present disclosure.

With reference to FIG. 6, an example table 80 of vehicles containing the scanners 30a, 30b, and 30n targeted by the advertising device 20 are shown. The advertising device 20 may run an application having a graphical user interface including the example table 80 to show a user the vehicles having the scanners 30a, 30b, 30n, that have already established trust relationships with the advertising device 20. The user can select the desired vehicles 40a, 40b, 40n with which the user wishes to connect by actuating touching icons 28, such that the advertising device 20 sends targeted advertising to only the scanners 30a, 30b, and 30n in vehicles 40a, 40b, and 40n.

Figure 7:
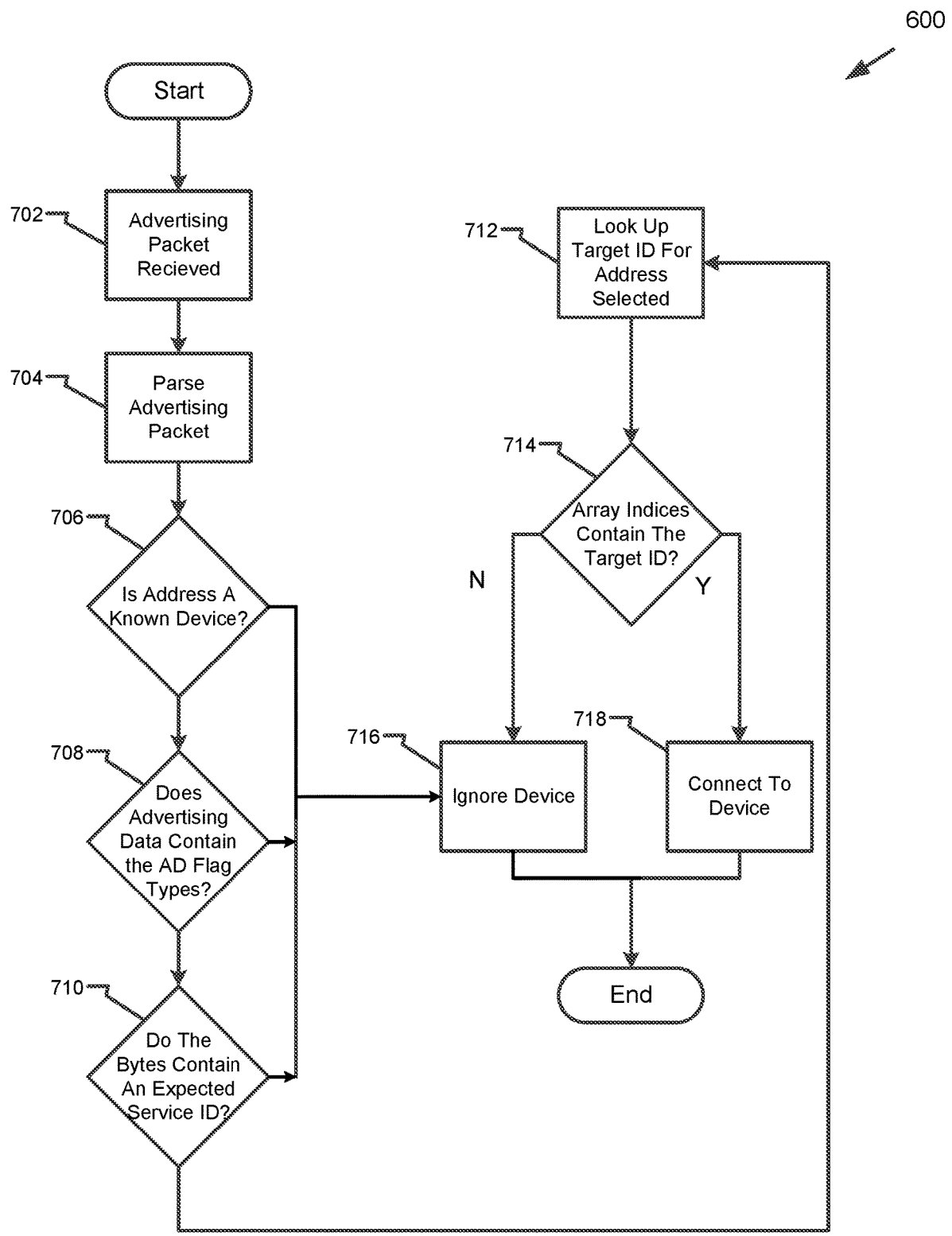
FIG. 7 illustrates a method of an advertising device transmitting targeted advertising according to the present disclosure.

With reference to FIG. 7, a flow diagram for a method the advertising device 20 transmitting the advertising packet 60 to the scanner 30 is shown. The method starts at 702 with the scanner 30 receiving an advertising packet 60 sent from the advertising device 20.

At 704, the scanner 30 parses the advertising packet 60 to determine if the advertising device 20 provides a service desired by the scanner 30 and if the address of the advertising device 20 is recognized by the scanner 30.

At 706, the scanner 30 determines if the advertising device 20 is a known device—that is, whether a prior trust relationship has been established between the advertising device 20 and the scanner 30 (i.e., whether the advertising device 20 and the scanner 30 have previously been paired). If true, control continues at 708. If false, control continues at 716.

At 708, the scanner 30 determines if the advertising data 68 contains AD flag types "06," "07," and "FF." If true, control continues at 710. If false, control continues at 716. At 710, the scanner 30 to determine if the advertising data 68 contains the service ID 76 corresponding to an expected service. If true, control continues at 712. If false, control continues at 716.

At 712, the scanner 30 determines whether the advertising device 20 has previously assigned a unique target ID to the scanner 30 and whether the unique target ID of the scanner 30 is contained within the target ID array of the UUID 70 in the advertising packet 60.

At 714, the scanner 30 parses the target ID 78 array of the UUID 70 in the advertising packet 60 to determine if the target ID 78 matches the unique target ID 78 assigned to the scanner 30 by the advertising device 20. If true, control continues at 718. If false, control continues at 716.

At 716, the scanner 30 ignores the advertising device 20, and no communication connection is established between the advertising device 20 and the scanner 30. At 718, the scanner 30 connects to the advertising device 20.

Figure 8:
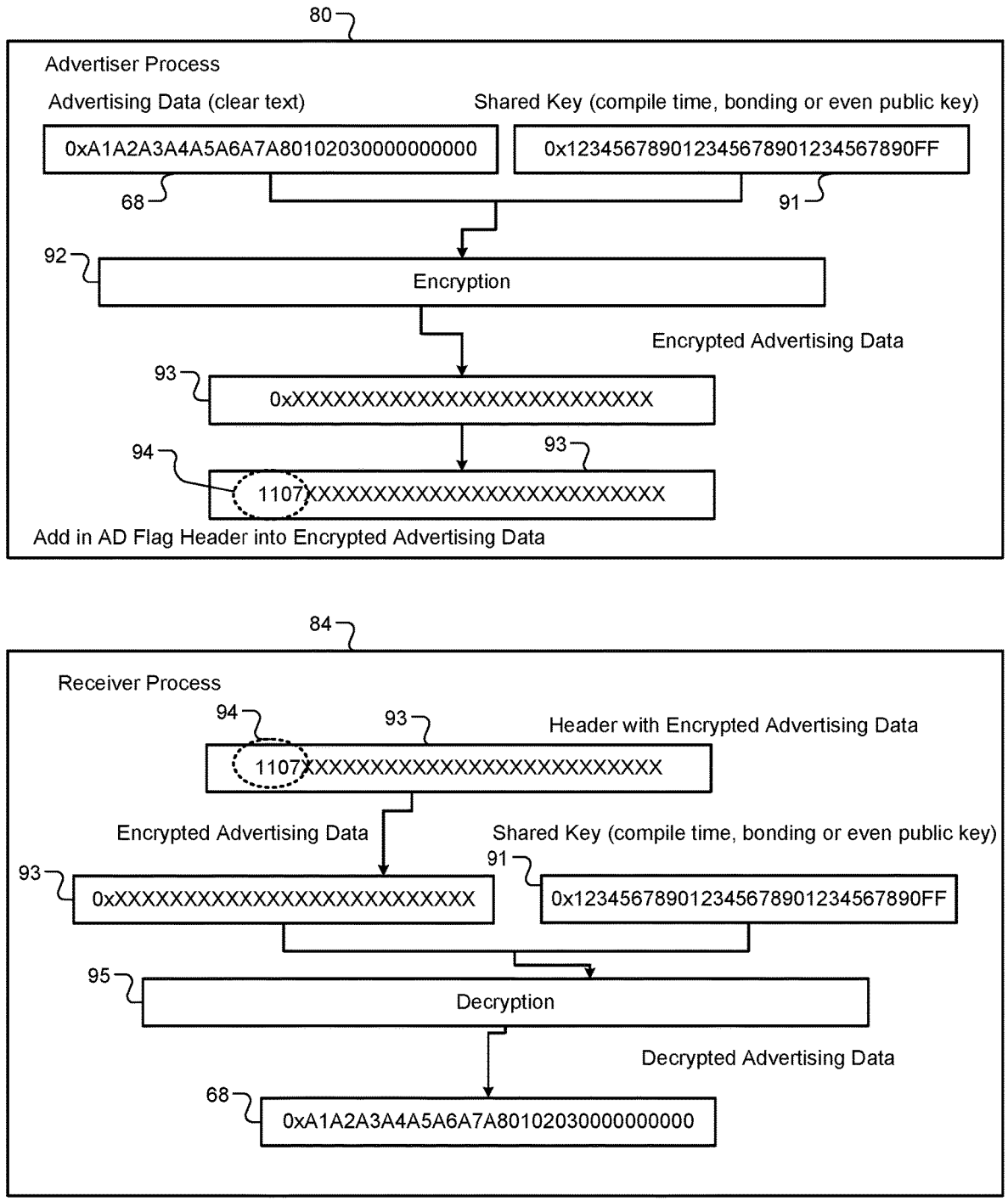
FIG. 8 illustrates an advertising device process and a scanner process for encrypting and decrypting advertising data according to the present disclosure.

With reference to FIG. 8, an encryption/decryption process is shown for the advertising device 20 and the scanner 30. Encryption 92 occurs prior to the advertising device 20 broadcasting the advertising packet 60 to the scanner 30. Since the UUIID is public information, any observer can learn the target IDs 78 as well as the service IDs 76 contained in the advertising data 68. The advertising device 20 encrypts the advertising data 68 using a shared key 91.

After the advertising device 20 has finished encrypting the advertiser data 68, the advertising device 20 will add the AD header 94 into the encrypted advertising data 93. Once the advertising data 68 is received by the scanner 30 decryption 95 occurs. The encrypted advertising data 93 may be decrypted using the shared key 91 such as a pre-shared key and/or a learned key. A learned key is transferred from the advertising device 20 to the scanner 30 along with the target ID 78 after the pairing is completed between the scanner 30 and the advertising device 20. A pre-shared key is the shared key 91 that is shared between the scanner 30 and the advertising device 20 before the key needs to be used. While examples of encryption/decryption are provided in terms of a learned key and/or pre-shared key, other encryption/decryption methods may be used.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system comprising:
   a scanner; and
   an advertising device configured to: (i) exchange security information with the scanner; (ii) pair with the scanner in response to the security information of the scanner being authenticated; (iii) generate a target ID for the scanner and store the target ID of the scanner in a memory of the advertising device; (iv) assign and transmit the target ID to the scanner; and (v) broadcast an advertising packet that includes the target ID of the scanner;
   wherein:
   the scanner is configured to: (i) exchange security information with the advertising device; (ii) pair with the advertising device in response to the security information of the advertising device being authenticated; (iii) receive and save the target ID assigned by the advertising device; (iv) receive the advertising packet containing the target ID; and (v) determine, in response to receiving the advertising packet, whether the target ID contained in the advertising packet matches the target ID of the scanner;
   the advertising packet further comprises a BLE Header and protocol data unit (PDU), and the PDU includes a MAC address and advertising data that includes the target ID;
   the scanner is configured to connect to an ECU of a vehicle, and the advertising device is a mobile device running a mobile operating system;
   the advertising data further comprises an AD flag, an indicator, and a service ID, the indicator identifies a byte size of the advertising data, and the AD flag is a parsing flag that indicates how the scanner should parse the advertising data; and
   the scanner is further configured to parse the advertising data to determine if the service ID matches the service ID that the scanner has requested, and ignores the advertising device in response to determining that the service ID does not match the service ID that was requested by the scanner.

2. The system according to claim 1, wherein the scanner is further configured to determine if the AD flag matches a predetermined AD flag, and ignores the advertising device in response to determining that the AD flag does not match the predetermined AD flag.

3. The system according to claim 2, wherein the scanner, in response to determining that the target ID of the advertising packet matches the target ID assigned to the scanner, connects to the mobile device.

4. The system according to claim 3, wherein the scanner, in response to determining that the target ID of the advertising packet does not match the target ID assigned to the scanner, does not connect to the mobile device.

5. The system according to claim 4, wherein the advertising data is encrypted before the advertising device broadcasts the advertising packet to the scanner.

6. The system according to claim 5, wherein scanner decrypts the advertising data using a key provided to the scanner by the advertising device.

7. A method comprising: (i) exchanging, with an advertising device and a scanner, security information; (ii) pairing the advertising device and the scanner in response to the security information of the advertising device and the scanner being authenticated; (iii) generating, with the advertising device, a target ID for the scanner and storing the target ID of the scanner in a memory of the advertising device; (iv) assigning and transmitting, with the advertising device, the target ID to the scanner; (v) receiving and saving, with the scanner, the target ID assigned by the advertising device; (vi) broadcasting, with the advertising device, an advertising packet that includes the target ID of the scanner; (vii) receiving, with the scanner, the advertising packet containing the target ID; and (viii) determining, with the scanner, whether the target ID contained in the advertising packet matches the target ID of the scanner in response to receiving the advertising packet;
   wherein:
   the advertising packet further comprises a BLE Header and protocol data unit (PDU), and the PDU includes a MAC address and advertising data that includes the target ID;
   the scanner is configured to connect to an ECU of a vehicle, and the advertising device is a mobile device running a mobile operating system;
   the advertising data further comprises an AD flag, an indicator, and a service ID, the indicator identifies a byte size of the advertising data, and the AD flag is a parsing flag that indicates how the scanner should parse the advertising data; and
   the method further comprises parsing, with the scanner, the advertising data to determine if the service ID matches the service ID that the scanner has requested, and ignoring the advertising device in response to determining that the service ID does not match the service ID that was requested by the scanner.

8. The method of claim 7, further comprising ignoring the advertising device in response to determining that the AD flag does not match a predetermined AD flag.

9. The method of claim 8, further comprising connecting to the mobile device in response to determining that the target ID of the advertising packet matches the target ID assigned to the scanner.

10. The method of claim 9, wherein the scanner, in response to determining that the target ID of the advertising packet does not match the target ID assigned to the scanner, does not connect to the mobile device.

11. The method of claim 10, further comprising encrypting, with the advertising device, the advertising data before the advertising device broadcasts the advertising packet to the scanner.

12. The method of claim 11, further comprising decrypting, with the scanner, the advertising data using a key provided to the scanner by the advertising device.

13. A system comprising:
a scanner; and
an advertising device configured to: (i) exchange security information with the scanner; (ii) pair with the scanner in response to the security information of the scanner being authenticated; (iii) generate a target ID for the scanner and store the target ID of the scanner in a memory of the advertising device; (iv) assign and transmit the target ID to the scanner; and (v) broadcast an advertising packet that includes the target ID of the scanner;
wherein:
the scanner is configured to: (i) exchange security information with the advertising device; (ii) pair with the advertising device in response to the security information of the advertising device being authenticated; (iii) receive and save the target ID assigned by the advertising device; (iv) receive the advertising packet containing the target ID; and (v) determine, in response to receiving the advertising packet, whether the target ID contained in the advertising packet matches the target ID of the scanner;
the advertising packet further comprises a BLE Header and protocol data unit (PDU), wherein the PDU includes a MAC address and advertising data that includes the target ID;
the scanner is configured to connect to an ECU of a vehicle, and the advertising device is a mobile device running a mobile operating system;
the advertising data further comprises an indicator and a service ID and the indicator identifies a byte size of the advertising data; and
the scanner is further configured to parse the advertising data to determine if the service ID matches the service ID that the scanner has requested and ignores the advertising device in response to determining that the service ID does not match the service ID that was requested by the scanner.

14. The system according to claim 13, wherein the advertising data further comprises an AD flag that is a parsing flag that indicates how the scanner should parse the advertising data.

15. The system according to claim 14, wherein the scanner is further configured to determine if the AD flag matches a predetermined AD flag, and ignores the advertising device in response to determining that the AD flag does not match the predetermined AD flag.

16. The system according to claim 15, wherein the scanner, in response to determining that the target ID of the advertising packet matches the target ID assigned to the scanner, connects to the mobile device.

17. The system according to claim 16, wherein the scanner, in response to determining that the target ID of the advertising packet does not match the target ID assigned to the scanner, does not connect to the mobile device.

18. The system according to claim 17, wherein the advertising data is encrypted before the advertising device broadcasts the advertising packet to the scanner.

19. The system according to claim 18, wherein scanner decrypts the advertising data using a key provided to the scanner by the advertising device.

* * * * *